(12) United States Patent
Dorsey

(10) Patent No.: US 8,485,134 B2
(45) Date of Patent: Jul. 16, 2013

(54) CONTAINMENT SYSTEM FOR ANIMALS

(76) Inventor: Vernard Brien Dorsey, Metairie, LA (US)

( * ) Notice: Subject to any disclaimer, the term of this patent is extended or adjusted under 35 U.S.C. 154(b) by 113 days.

(21) Appl. No.: 13/306,656

(22) Filed: Nov. 29, 2011

(65) Prior Publication Data

US 2012/0186528 A1 Jul. 26, 2012

Related U.S. Application Data

(60) Provisional application No. 61/435,420, filed on Jan. 24, 2011.

(51) Int. Cl.
*A01K 1/00* (2006.01)
(52) U.S. Cl.
USPC ........ 119/496; 119/453; 119/497; 220/254.1; 220/263
(58) Field of Classification Search
USPC ................. 119/416, 452, 453, 482, 496, 497, 119/418, 500; 220/262–264, 908, 260, 254.1, 220/254.9, 259.5, 256.1; 43/54.1–57.3, 58, 43/100–106, 69, 74
See application file for complete search history.

(56) References Cited

U.S. PATENT DOCUMENTS

| | | | | |
|---|---|---|---|---|
| 2,463,839 A * | 3/1949 | Wilson | ............................... | 43/69 |
| 3,834,352 A * | 9/1974 | Gervis | ........................... | 119/453 |
| 5,187,890 A * | 2/1993 | Johnston | ............................. | 43/4 |
| 7,108,148 B2 * | 9/2006 | Lu | .................................. | 220/263 |
| 8,087,532 B2 * | 1/2012 | Brown et al. | ................. | 220/264 |
| 2007/0056524 A1 * | 3/2007 | Barca | ............................. | 119/496 |
| 2010/0300370 A1 * | 12/2010 | Hundt | ........................... | 119/452 |

* cited by examiner

*Primary Examiner* — David Parsley
*Assistant Examiner* — Danielle Clerkley
(74) *Attorney, Agent, or Firm* — Sinorica, LLC (57) ABSTRACT

An animal containment unit comprises a lid and a base container. The base container comprises an animal compartment with breathing holes, a foot release pedal, and a lock receiver. The lid is attached to the base container by means of a hinge and comprises a sliding gate, a locking mechanism, a slot opening gasket and bristle which act as a protective barrier and reduces the risk of animal strike back. The sliding mechanism provides users with access into the animal compartment when the lid is in a closed position and secured to the base container.

15 Claims, 5 Drawing Sheets

CONTAINMENT SYSTEM FOR ANIMALS

The current application claims a priority to the U.S. Provisional Patent application Ser. No. 61/435,420 filed on Jan. 24, 2011.

FIELD OF THE INVENTION

The present invention relates generally to a container for transporting animals. More specifically, the present invention is a system that can securely and safely hold animals for safe handling.

BACKGROUND OF THE INVENTION

Traditionally, the containment of animals can be a tedious and risky task that requires a trained and experienced professional. With certain animals being more harmful than others, it is important to maintain and execute safe procedures for containing and releasing the animals. Currently, many animal control specialists are required to contain animals using simple cages, boxes, or bags. When handling animals in a cage, the user is usually forced to handle the cages directly with their hands. At this time, the hands of the user are exposed to the contained animal while grasping/carrying the cage. When handling animals in boxes, users traditionally utilize a large opening to place an animal into and out of the box. However, with a large opening, the animal is also presented with the opportunity to leap out and escape, or possesses the ability to strike. Furthermore, many containment boxes are non-transparent. As a result, where within the box the animal is located is generally hard to determine. When handling animals using a bag or sack, the user is generally required to reach into the sack to extract the animal for release. As a result, the user's hands and arm are exposed for attack by the contained animal. The present invention provides a system that is able to overcome all of the potential risks that come with traditional methods of animal containment. The containment system establishes a safe way for people to handle reptiles, particularly snakes and other potentially dangerous, small animals (e.g. Raccoons, cats, badgers). The present invention is an animal containment system that when used in conjunction with restraining tongs, lassos, hooks, cat graspers, and other such devices provide a safe means for handling such animals. The present invention can improve the safety for both the animal handlers as well as the animals themselves. The containment system can be made from 100% recyclable materials and support a green environment by enabling safe and harmless securing and removal of animals.

DETAIL DESCRIPTIONS OF THE INVENTION

All illustrations of the drawings are for the purpose of describing selected versions of the present invention and are not intended to limit the scope of the present invention.

The present invention is an animal containment device that provides the user with the ability to safely contain an animal or safely release a contained animal. The present invention is suitable for containing a large variety of animals from different species. The animals that may be contained by the present invention can be small animals including rats, snakes, lizards, or rabbits or even medium sized animals including raccoons, badgers, cats, or even certain dogs.

The present invention is a containment system that mainly comprises of a lid and a base container 1. The base container 1 is the component of the present invention that the animals are placed in. The base container 1 maybe manufactured into any shape including cylinder drums, rectangular, rectilinear, hexagonal, and any other shape suitable for containing animals. The base container 1 may also be manufactured to be any size, from 5-ounces containers for carrying mice to 55-gallon drums for carrying larger animals such as dogs. The lid 2 is an assembly that is jointly connected to the base container 1 for trapping an animal within the base container 1. The lid 2 can easily be opened, closed, and locked to release or contain an animal. The lid 2 can also be manufactured into any shape that allows it to conform to the base container 1. The lid 2 additionally functions to provide a user with the ability to handle an animal contained within the base unit without fully opening the lid 2.

Figure 2:
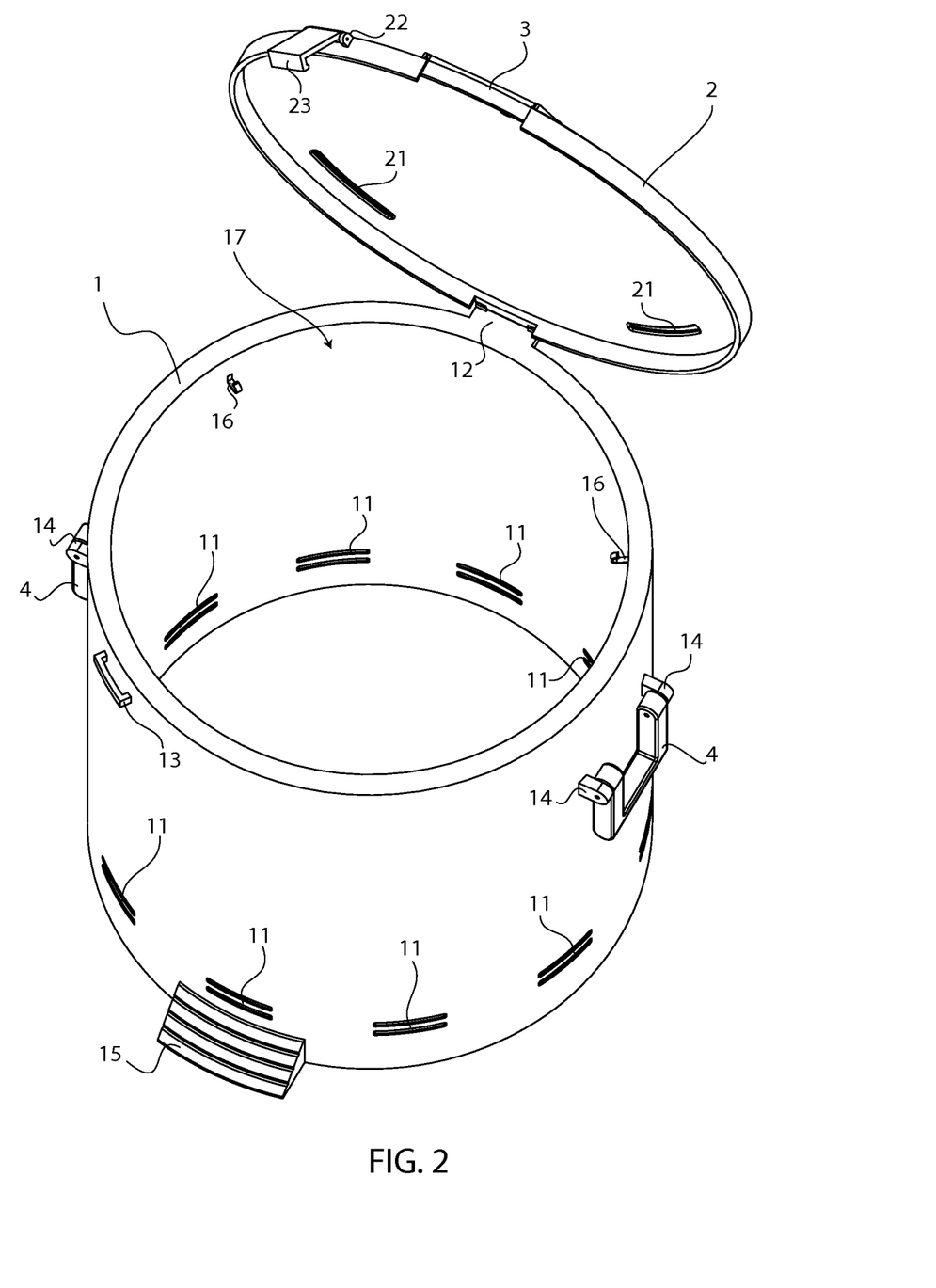
FIG. 2 is a view of the present invention with the lid in an open position.
Figure 4:
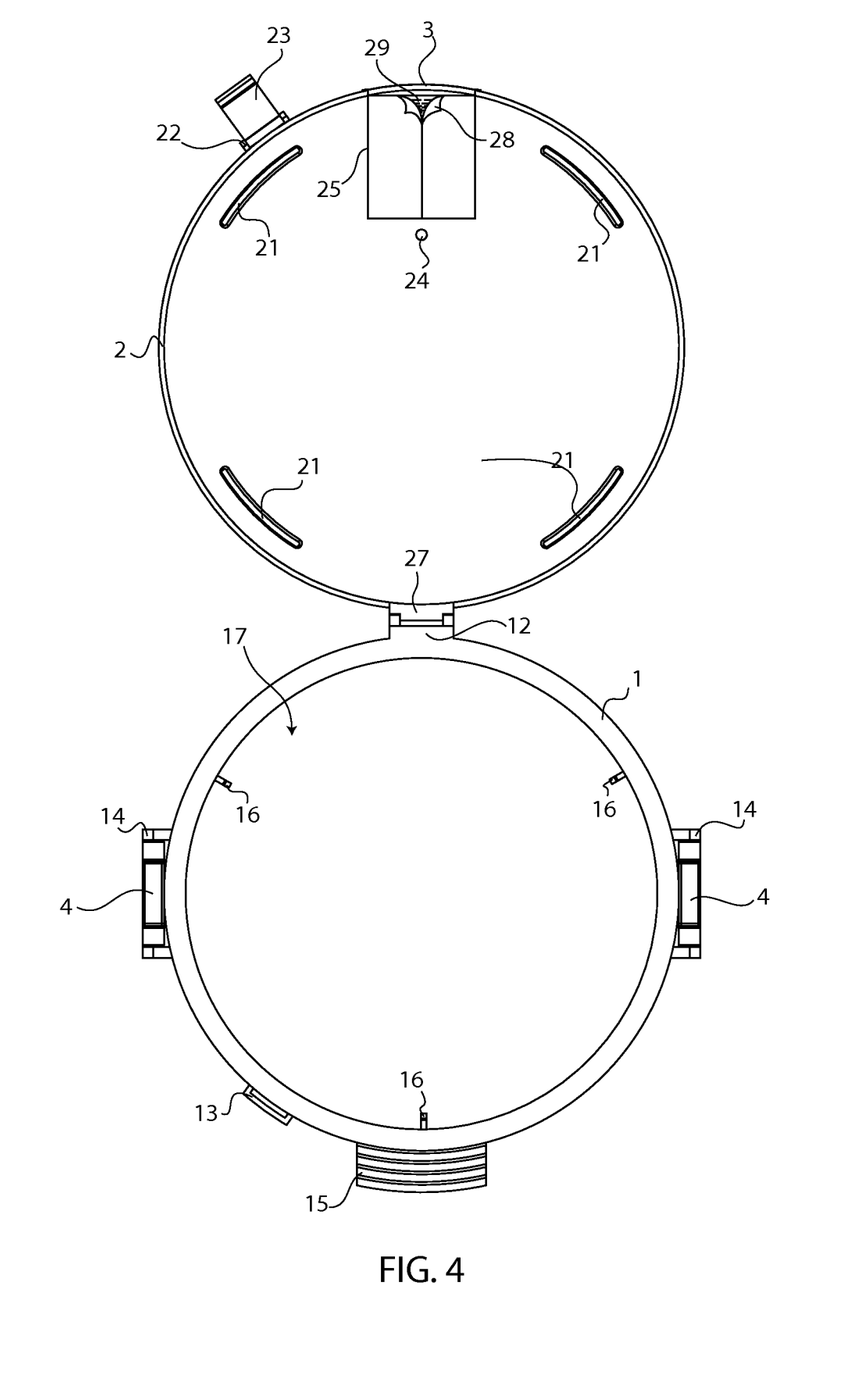
FIG. 4 is a top plan view of the present invention showing the lid in a fully open position.

In reference to FIG. 2 and FIG. 4, the base container 1 further comprises of a plurality of base breathing holes 11, a first hinge bearing 12, a lock receiver 13, a pair of handle hinges 14, a foot release pedal 15, a plurality of staging hooks 16, and an animal compartment 17. The animal compartment 17 is a recessed space in the base container 1 that is used to contain an animal. The animal compartment 17 may be a recessed space of any shape regardless of the shape of the base container 1. However, in the preferred embodiment of the present invention, the animal compartment 17 is shaped correspondingly to the shape of the base container 1 to provide the base container 1 a consistent wall thickness. The first hinge bearing 12 is extended from the rear of a top edge of the base container 1. The first hinge bearing 12 provides the base container 1 with a dock that allows the connection of the lid 2. The lock receiver 13 is positioned on an outer wall of the base container 1 to provide an edge that can receive a latch. The pair of handle hinges 14 is also positioned on the outer walls of the base container 1. The pair of handle hinge consists of a first handle hinge and a second handle hinge. The first handle hinge is positioned on the outer wall of the base container 1 opposite of the second handle hinge. A pair of handles 4 is jointly connected to the pair of handle hinges 14 on the base container 1 to provide the user with easy handling. The pair of handle hinges 14 can be a spring loaded hinge or a simple free joint hinge. However, in the preferred embodiment of the present invention, the pair of handle hinges 14 is of a simple pivot design that can be spring loaded during any future design changes. In other embodiments of the present invention the base container 1 may have more than a pair of handle hinges 14 and handles to allow the user the present invention in any orientation or direction. On the interior surface of the animal compartment 17 is positioned the plurality of staging hooks 16. The plurality of staging hooks 16 is peripherally positioned and distributed on an inner wall of the base container 1 within the animal compartment 17. In the preferred embodiment of the present invention, the plurality of staging hooks 16 is positioned adjacently to the top edge of the base container 1. The plurality of staging hooks 16 provide the user with a mount for bags that can further contain animals such as snakes within the animal compartment 17. In the preferred embodiment of the present invention, the plurality of staging hooks 16 is mounted on the inside of the base container 1 approximately one inch below the outer base rim. The plurality of staging hooks 16 is distributed evenly within the rim of to support the even staging of a drawstring sack, such as a reptile bag. In other embodiments of the present invention, the bags can also be secured by hook and loops, clips, Velcro, or buttons and utilized in the same fashion.

Figure 1:
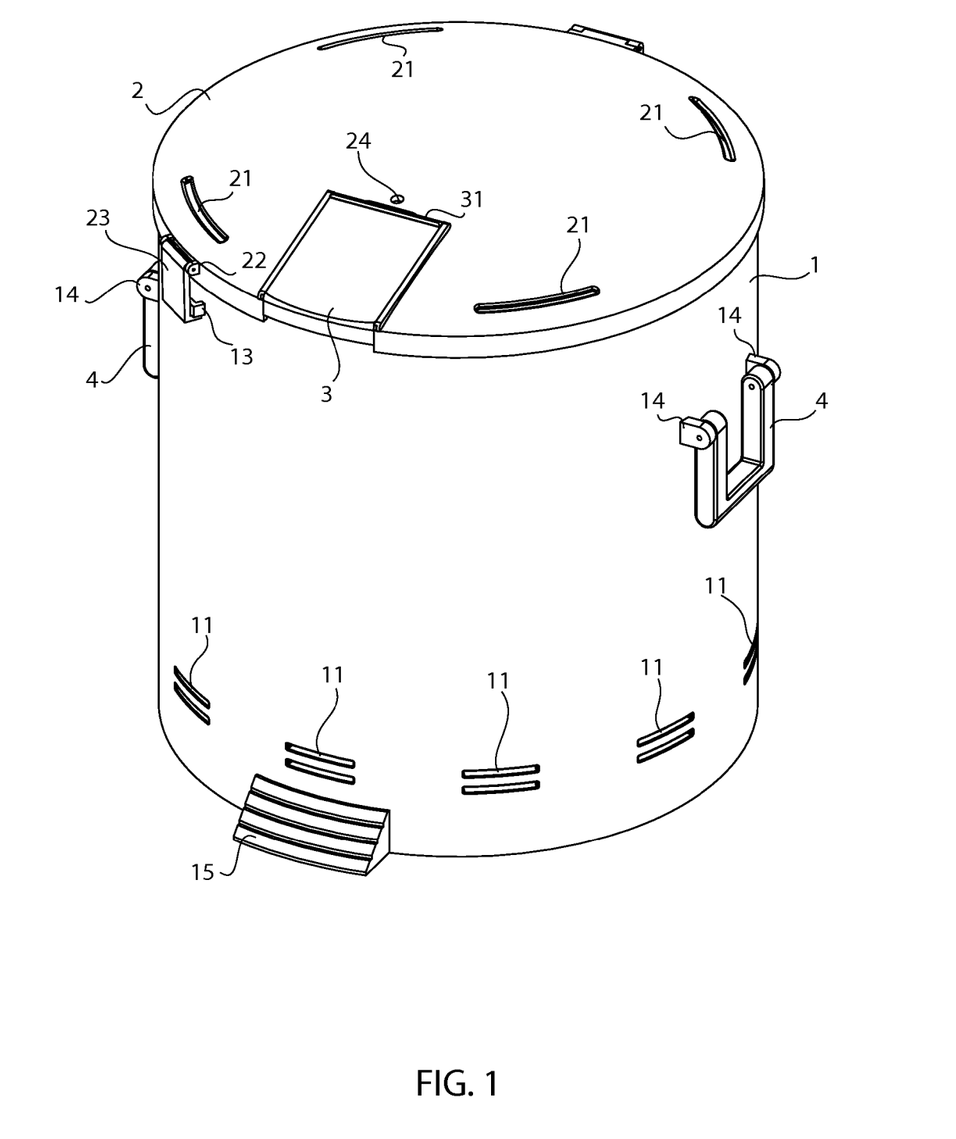
FIG. 1 is a perspective view of the present invention.
Figure 5:
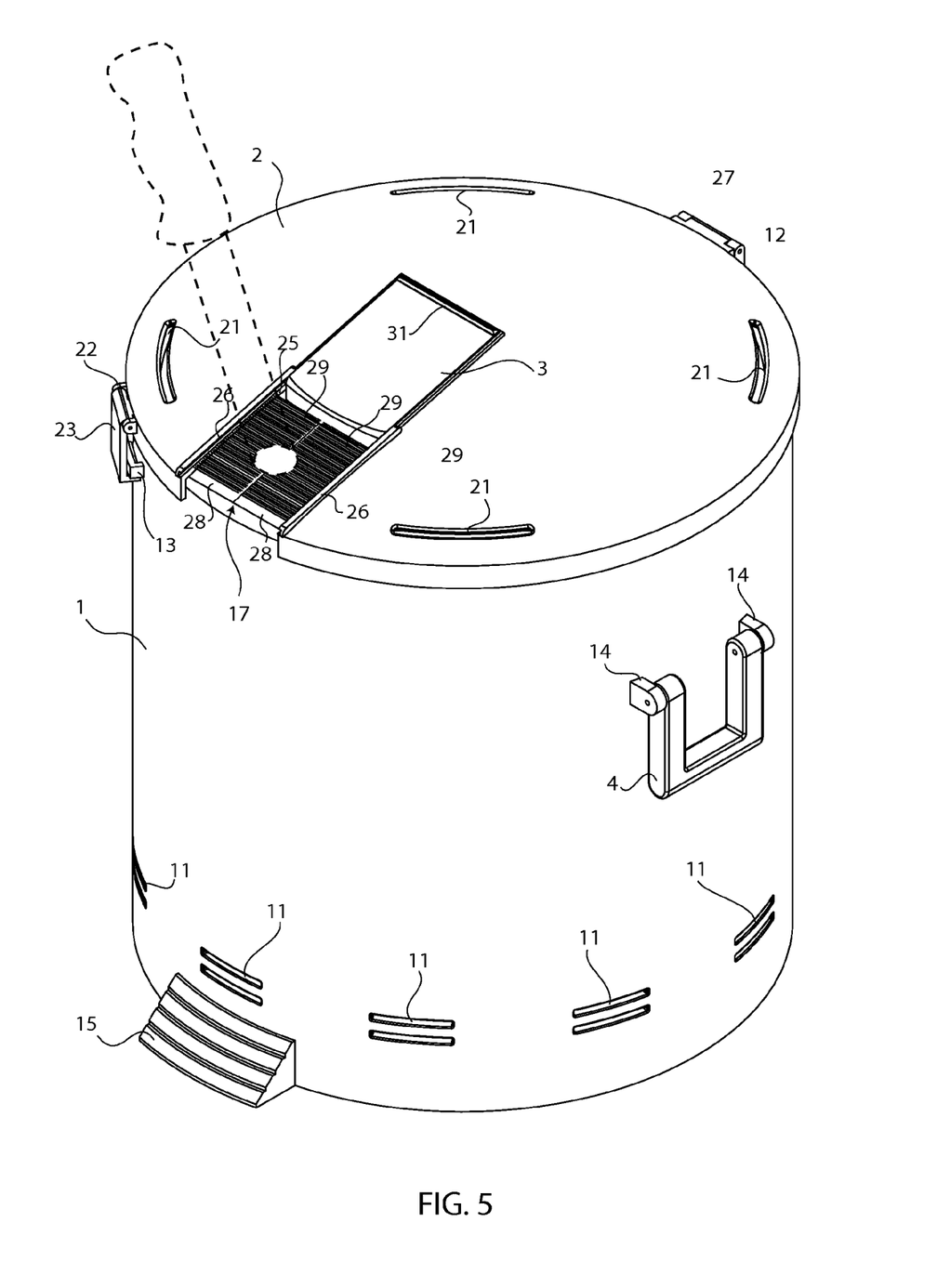
FIG. 5 is a perspective view of the present invention showing the sliding gate in an open position providing an animal technician access into the animal compartment to handle the contained animal.

In reference to FIG. 1-2 and FIG. 5, the lid 2 comprises a plurality of lid breathing holes 21, a lock hinge 22, a gate slot 25, a gate track 26, a gate slot gasket 28, a gate opening bristle 29, a draw string hole, and a second hinge bearing 27. The entire assembly of the lid 2 further consists of a locking latch 23 and a sliding gate 3. The locking latch 23 is connected onto the lid 2 by means of the lock hinge 22. The lock hinge 22 peripherally extended from the lid 2. The locking latch 23 is jointly connected to the lock hinge 22. Adjacent to the locking latch 23 and the lock hinge 22 is positioned the gate slot 25. The gate slot 25 provides with an opening that can lead into the animal compartment 17 when the lid 2 is sealed and closed over the base container 1. The gate slot 25 is a cut out opening that is positioned on the front side of the lid 2. On the side edges of the gate slot 25 are the gate tracks 26. The gate tracks 26 are grooves aligned and positioned along the gate slot 25. Positioned below the gate track 26 along the gate slot 25 is the gate slot gasket 28. The gate slot gasket 28 is two sheets of rubber which are extended from the gate slot 25 that meet in the middle of the opening. Positioned between the gate slot gasket 28 and the gate track 26 is the gate opening bristles 29. The gate opening bristles 29 are two opposing sets of bristles are mounted at the slot openings directly above or below the rubber seal to provide a secondary protective barrier that further prevents a contained animal from escaping through the slot opening. The gate slot gasket 28 and the gate opening bristles provide further protection as another barrier to keep any animals contained within the animal compartment 17 from escaping through the gate slot 25. The sliding gate 3 is fitted into gate slot 25 while being aligned and engaged to the gate track 26. The gate track 26 allows the sliding gate 3 to slide up and down the gate slot 25 to provide access into the animal compartment 17 without lifting the entire lid. The sliding gate 3 further comprises of a gate handle 31 to provide easy manipulation. The gate handle 31 is a long notch that is positioned on a top end of the sliding gate 3. The gate handle 31 provides the user with a surface to push and pull the sliding gate 3 into an open and closed position. The sliding gate 3's movements can be forward and backwards over the gate slot 25, from side to side, or be a pivoting motion. The drawstring hole/notch 24 is a hole/notch that is traversed through the lid 2 adjacent to the gate slot 25. The drawstring hole 24 is used in case a user is containing an animal inside a drawstring sack within the animal compartment 17. The user is able to pull the drawstring of the sack through the drawstring hole 24 to close the sack's opening before lifting the lid 2. To connect the lid 2 to the base container 1, the second hinge bearing 27 is extended from a rear side of the lid 2. The importance of the drawstring sack, such as a reptile bag, is to allow handlers to capture and remove animals from the containment unit individually or by species. The reptile bag is a cloth bag that can be secured within the animal containment unit in an open position with the use of several staging hooks. In the preferred embodiment of the present invention, the drawstring sack is made of 100% cotton material to provide air flow and allow the contained animal to breathe. Cotton fiber is also easy to puncture for staging on the plurality of staging hooks 16. The drawstring sack is also equipped with a drawstring that will allow the bag to be collapsed and securely closed, once an animal is placed in the sack and secured in the containment unit.

Figure 3:
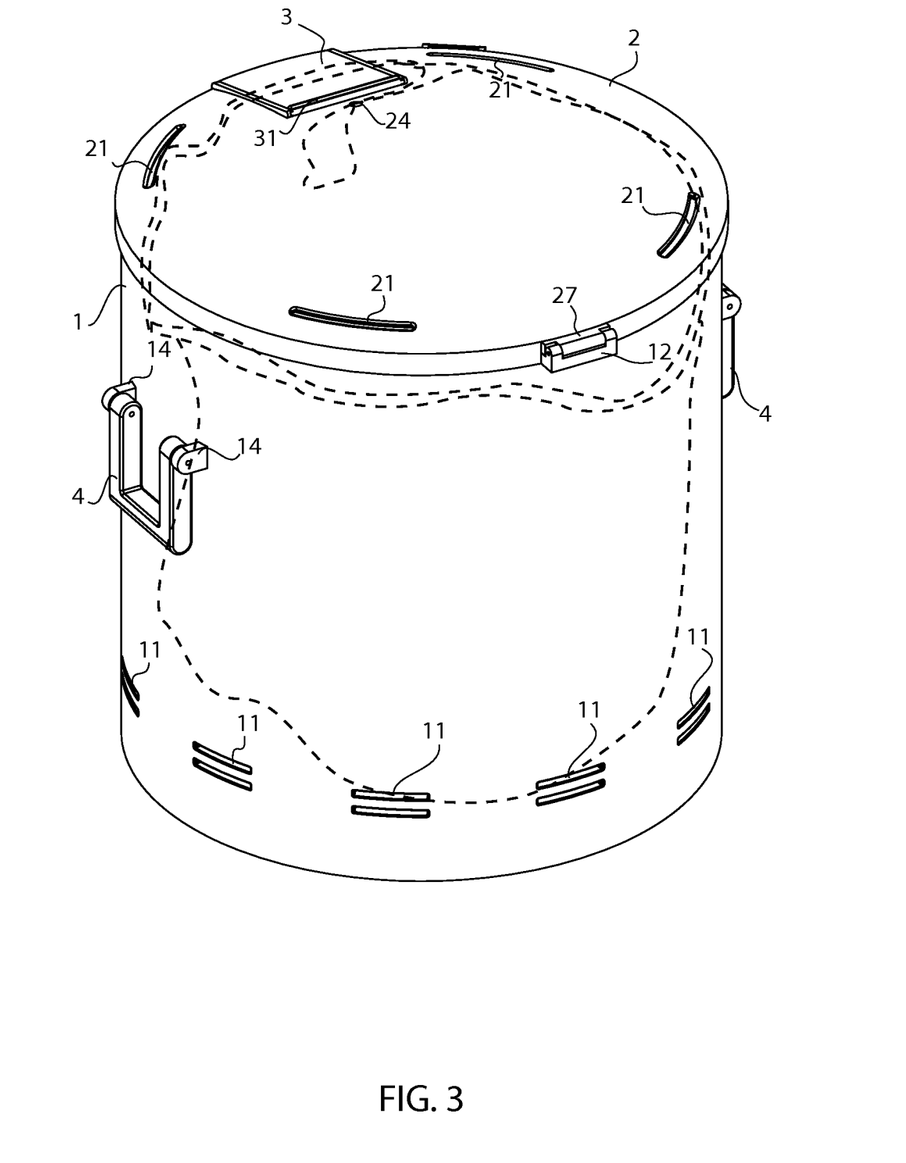
FIG. 3 is a rear perspective view of the present invention.

In reference to FIG. 3, the lid 2 is jointly fastened to the base container 1 by means of the joint connection between the first hinge bearing 12 and the second hinge bearing 27. In the preferred embodiment of the present invention, the first hinge bearing 12 and the second hinge bearing 27 are connected to form a spring loaded hinge joint. The spring loaded hinge will force the lid 2 to an open position while the lid 2 is released from a lock positioned. When the lid 2 is closed, the lid 2 may be locked to the base container 1 by means of the locking latch 23 and the lock receiver 13. To secure the lid 2 into a closed positioned over the opening of the base container 1, the locking latch 23 and the lock receiver 13 may be mounted on either the left or the right side of the gate slot 25. The locking latch 23 jointly connected to the lid 2 can be pivoted down to engage the lock receiver 13 to securely keep the lid 2 secure to the base container 1. The locking latch 23 can be a spring loaded pivot latch or a spring-loaded slide latch. However, in the preferred embodiment of the present invention, the locking latch 23 is a spring-loaded pivot latch. The locking latch 23 on the lid 2 is aligned with the lock receiver 13 on the base container 1. The alignment allows the locking latch 23 to properly latch onto the lock receiver 13 to securely keep the lid 2 in a closed position.

The plurality of base breathing holes 11 is holes that are traversed through the base container 1 into the animal compartment 17. Similarly, the plurality of lid breathing holes 21 is holes that are traversed through the lid 2 into the animal compartment 17. The plurality of base breathing holes 11 is peripherally distributed about the base container 1 to provide proper ventilation and air supply to the contained animal. The present invention is designed to provide users with a safe and humane method of transporting and/or restraining animals.

The present invention further comprises the foot release pedal 15. The foot release pedal 15 is situated at the bottom edge of the base container 1 and is used to release the locking latch 23 from the lock receiver 13. With the locking latch 23 being a spring-loaded lock, once the foot release pedal 15 is depressed, the locking latch 23 is released from the lock receiver 13. As a result, the lid 2 is released, allowing the spring loaded hinge between the lid 2 and the base container 1 to automatically lift the lid 2 from the base container 1. The foot release pedal 15 is connected to the lock receiver 13 within the base container 1.

In the preferred embodiment of the present invention, the lid assembly 2 has a transparent lid made from the materials selected from the group consisting of plastic, plexiglass, polycarbonate, mesh, or any other types of materials that are able to securely contain an animal while providing transparency. The transparency of the lid assembly 2 allows the user to identify the position and behavior of a contained animal when attempting to safely regain control of the animal for extraction from the containment system. Similar to the lid 2, the sliding gate 3 is transparent and is made from a material selected from the group consisting of plastic, plexiglass, polycarbonate, or any other sturdy material that can securely contain an animal while providing transparency.

In another embodiment of the present invention, the containment system may comprise of an optional wire mesh. The wire mesh may be lined onto each of the plurality of lid breathing holes 21 and the plurality of base breathing holes 11. The function of the wire mesh is to provide additional protection for the user from animals that are able to excrete and project hazardous substances such as venom. Such animals can include spitting cobras and other various types of animals that project dangerous fluids as a self defense mechanism. Additionally, the wire mesh can act as a barrier for all of the different openings on the containment system to prevent smaller animals, such as small or adolescent reptiles from escaping.

To secure an animal in the containment system, the user is able to follow the following instructions:
1. When encountering a snake or other small animal, the user first secures the animal with the distal end of a pair of tongs (or other suitable device).
2. With the lid open, the user places the secured animal inside the base container.
3. Once the animal has been completely placed inside the base container, before releasing the animal from the tongs, the user closes the lid with the arm of the tongs aligned with the slot opening so that the arm of the tongs slides radially into the slot opening as the lid closes over the base container.
4. Once the lid assembly is locked in place by the lid-locking mechanism, the user releases the animal from the distal end of the tongs and removes the tongs from the based container by pulling the arm and then the distal end of the tongs longitudinally through the slot opening, leaving the animal within the containment system.
5. The user moves the sliding gate into position over the slot opening to ensure that the animal does not escape from the containment system.

When removing an animal from the containment system:
1. Looking through the transparent lid, the user identifies the position of the animal.
2. Before unlocking the lid, the user inserts the distal end of the tongs longitudinally through the slot opening to establish a securing point on the animal.
3. Once the animal is safely secured with the tongs, the user unlocks and opens the lid, sliding the arm of the tongs radially out of the slot opening.
4. The user then safely uses the tongs to remove the secured animal from the containment system.

Utilizing the Reptile Bag Operation:

The bag is secured in the open position by a series of three or more hooks (hook and loops, clips, or buttons) staggered evenly on the inside rim of the containment unit. The reptile bag is outfitted with a drawstring that will allow the bag to be secured (closed), inside a securely fastened containment unit. When the bag is placed on the hooks, the drawstring shall be staged within the containment unit on the hinged side and fished through a hole in the lid of the unit. Once the animal is placed inside the bag and the unit is securely fastened, the bag can be closed inside the unit by pulling the drawstring exterior of the lid. The drawstring can be removed from the lid by pulling the string through the same slot opening used for snake tongs.

The present invention can be used by animal technicians in various different fields including exterminators, reptile enthusiasts, animal enthusiasts, humane societies, homeowners/ranchers, recreational workers, reptile shelter workers, zoo keepers, researchers, laboratory technicians, venom harvesters, local/state police or fire rescue, park services, hunters, OSHA, EPA, and other federal agencies.

Although the invention has been explained in relation to its preferred embodiment, it is to be understood that many other possible modifications and variations can be made without departing from the spirit and scope of the invention as hereinafter claimed.

What is claimed is:
1. An animal containment unit comprises,
a base container;
a lid;
a foot release pedal;
a locking latch;
a sliding gate;
a pair of handles;
the base container comprises a plurality of base breathing holes, a first hinge bearing, a lock receiver, a pair of handle hinges, a plurality of staging hooks, and a animal compartment;
the lid comprises a plurality of lid breathing holes, a lock hinge, a gate slot, a slot opening gasket, a slot opening bristles, a gate track, a drawstring hole, and a second hinge bearing;
the sliding gate comprises a gate handle; and
the lid being jointly fastened to the base container by means of the first hinge bearing being jointly fastened to the second hinge bearing.

2. The animal containment unit as claimed in claim 1 comprises,
the animal compartment being a recessed space in the base container;
the plurality of base breathing holes being peripherally distributed about the base container and traversing through the base container into the animal compartment;
the first hinge bearing being extended from a top edge of the base container;
the lock receiver being positioned on an outer wall of the base container;
the pair of handle hinges being positioned on the outer wall of the base container;
the foot release pedal being positioned adjacent to a bottom edge of the base container; and
the plurality of staging hooks being peripherally positioned and distributed on an inner wall of the base container.

3. The animal containment unit as claimed in claim 1 comprises,
the plurality of lid breathing holes being traversed through the lid;
the lock hinge being peripherally extended from the lid;
the locking latch being jointly connected to the lock hinge;
the gate slot being a cut out opening positioned on a front side of the lid;
the gate track being positioned along the gate slot;
the drawstring hole being traversed through the lid adjacent to the gate slot; and
the second hinge bearing being extended from a rear side of the lid.

4. The animal containment unit as claimed in claim 1 comprises,
the pair of handles being jointly connected to the pair of handle hinges on the base container.

5. The animal containment unit as claimed in claim 1 comprises,
the locking latch being aligned with the lock receiver; and
the locking latch being latched onto the lock receiver.

6. The animal containment unit as claimed in claim 1 comprises,
the pair of handle hinges includes a first handle hinge and a second handle hinge; and
the first handle hinge being positioned on the outer wall of the base container opposite of the second handle hinge.

7. The animal containment unit as claimed in claim 3 comprises,
the sliding gate being fitted into the gate slot;
the sliding gate being aligned and engaged with the gate track;

the gate handle being a notch positioned on a top end of the sliding gate;
the slot opening gasket being mounted onto the gate slot below the gate track; and
the slot opening bristles being mounted between the slot opening gasket and the gate track.

8. An animal containment unit comprises,
a base container;
a lid;
a foot release pedal;
a locking latch;
a sliding gate;
a pair of handles;
the base container comprises a plurality of base breathing holes, a first hinge bearing, a lock receiver, a pair of handle hinges, a plurality of staging hooks, and a animal compartment;
the lid comprises a plurality of lid breathing holes, a lock hinge, a gate slot, a slot opening gasket, a slot opening bristles, a gate track, a drawstring hole, and a second hinge bearing;
the sliding gate comprises a gate handle;
the lid being jointly fastened to the base container by means of the first hinge bearing being jointly fastened to the second hinge bearing;
the animal compartment being a recessed space in the base container;
the plurality of base breathing holes being peripherally distributed about the base container and traversing through the base container into the animal compartment;
the plurality of lid breathing holes being traversed through the lid;
the lock hinge being peripherally extended from the lid;
the locking latch being jointly connected to the lock hinge;
the pair of handles being jointly connected to the pair of handle hinges on the base container;
the pair of handle hinges includes a first handle hinge and a second handle hinge; and
the first handle hinge being positioned on the outer wall of the base container opposite of the second handle hinge.

9. The animal containment unit as claimed in claim 8 comprises,
the first hinge bearing being extended from a top edge of the base container;
the lock receiver being positioned on an outer wall of the base container;
the pair of handle hinges being positioned on the outer wall of the base container;
the foot release pedal being positioned adjacent to a bottom edge of the base container; and
the plurality of staging hooks being peripherally positioned and distributed on an inner wall of the base container.

10. The animal containment unit as claimed in claim 8 comprises,
the gate slot being a cut out opening positioned on a front side of the lid;
the gate track being positioned along the gate slot;
the drawstring hole being traversed through the lid adjacent to the gate slot; and
the second hinge bearing being extended from a rear side of the lid.

11. The animal containment unit as claimed in claim 8 comprises,
the locking latch being aligned with the lock receiver; and
the locking latch being latched onto the lock receiver.

12. The animal containment unit as claimed in claim 10 comprises,
the sliding gate being fitted into the gate slot;
the sliding gate being aligned and engaged with the gate track;
the gate handle being a notch positioned on a top end of the sliding gate;
the slot opening gasket being mounted onto the gate slot below the gate track; and
the slot opening bristles being mounted between the slot opening gasket and the gate track.

13. An animal containment unit comprises,
a base container;
a lid;
a foot release pedal;
a locking latch;
a sliding gate;
a pair of handles;
the base container comprises a plurality of base breathing holes, a first hinge bearing, a lock receiver, a pair of handle hinges, a plurality of staging hooks, and a animal compartment;
the lid comprises a plurality of lid breathing holes, a lock hinge, a gate slot, a slot opening gasket, a slot opening bristles, a gate track, a drawstring hole, and a second hinge bearing;
the sliding gate comprises a gate handle;
the lid being jointly fastened to the base container by means of the first hinge bearing being jointly fastened to the second hinge bearing;
the animal compartment being a recessed space in the base container;
the plurality of base breathing holes being peripherally distributed about the base container and traversing through the base container into the animal compartment;
the plurality of lid breathing holes being traversed through the lid;
the lock hinge being peripherally extended from the lid;
the locking latch being jointly connected to the lock hinge;
the pair of handles being jointly connected to the pair of handle hinges on the base container;
the pair of handle hinges includes a first handle hinge and a second handle hinge;
the first handle hinge being positioned on the outer wall of the base container opposite of the second handle hinge;
the first hinge bearing being extended from a top edge of the base container;
the lock receiver being positioned on an outer wall of the base container;
the pair of handle hinges being positioned on the outer wall of the base container;
the foot release pedal being positioned adjacent to a bottom edge of the base container; and
the plurality of staging hooks being peripherally positioned and distributed on an inner wall of the base container.

14. The animal containment unit as claimed in claim 13 comprises,
the gate slot being a cut out opening positioned on a front side of the lid;
the gate track being positioned along the gate slot;
the drawstring hole being traversed through the lid adjacent to the gate slot;
the second hinge bearing being extended from a rear side of the lid;
the sliding gate being fitted into the gate slot;
the sliding gate being aligned and engaged with the gate track;
the gate handle being a notch positioned on a top end of the sliding gate;

the slot opening gasket being mounted onto the gate slot below the gate track; and the slot opening bristles being mounted between the slot opening gasket and the gate track.

15. The animal containment unit as claimed in claim 13 comprises, the locking latch being aligned with the lock receiver; and
the locking latch being latched onto the lock receiver.

\* \* \* \* \*